(12) United States Patent
Imashiro et al.

(10) Patent No.: US 10,388,967 B2
(45) Date of Patent: Aug. 20, 2019

(54) POROUS CARBON CATALYST, METHOD FOR PRODUCING SAME, ELECTRODE AND BATTERY

(71) Applicant: NISSHINBO HOLDINGS INC., Tokyo (JP)

(72) Inventors: Yasuo Imashiro, Chiba (JP); Yuji Kubota, Chiba (JP); Akiko Taira, Chiba (JP)

(73) Assignee: NISSHINBO HOLDINGS INC., Tokyo (JP)

(*) Notice: Subject to any disclaimer, the term of this patent is extended or adjusted under 35 U.S.C. 154(b) by 611 days.

(21) Appl. No.: 14/894,588

(22) PCT Filed: Jun. 4, 2014

(86) PCT No.: PCT/JP2014/064831
§ 371 (c)(1),
(2) Date: Nov. 30, 2015

(87) PCT Pub. No.: WO2014/199880
PCT Pub. Date: Dec. 18, 2014

(65) Prior Publication Data
US 2016/0104900 A1    Apr. 14, 2016

(30) Foreign Application Priority Data
Jun. 14, 2013    (JP) .................................. 2013-126098

(51) Int. Cl.
*B01J 21/18*    (2006.01)
*H01M 4/96*    (2006.01)
(Continued)

(52) U.S. Cl.
CPC ............... *H01M 4/96* (2013.01); *C01B 32/05* (2017.08); *H01M 4/8605* (2013.01);
(Continued)

(58) Field of Classification Search
CPC ....... B01L 21/18; H01M 4/96; H01M 4/8605; H01M 4/9016; H01M 4/9083;
(Continued)

(56) References Cited

U.S. PATENT DOCUMENTS 5,171,560 A * 12/1992 Tennent .................. B01J 27/20
264/29.2
6,843,919 B2 * 1/2005 Klabunde .............. B01D 53/02
210/660
(Continued)

FOREIGN PATENT DOCUMENTS

CN    102280613 A    12/2011
CN    102648050 A    8/2012
(Continued)

OTHER PUBLICATIONS

Yuliang An et al., "A Novel method for preparation of carbon coating iron nanoparticles." Advanced Materials Research, vol. 92, pp. 7-11 (Year: 2010).*
(Continued)

*Primary Examiner* — Patricia L. Hailey
(74) *Attorney, Agent, or Firm* — Oliff PLC

(57) ABSTRACT

A porous carbon catalyst exhibiting excellent catalytic activity and a method of producing the same, and an electrode and a battery. The porous carbon catalyst is obtained through carbonization of an organic polymer porous body having a skeleton containing a metal in an inside thereof. The porous carbon catalyst may have a skeleton containing the metal in an inside thereof, and the skeleton may be a particle aggregate-like skeleton. The method of producing a porous carbon catalyst includes carbonizing an organic polymer porous body having a skeleton containing a metal in an inside thereof.

7 Claims, 9 Drawing Sheets

(51) Int. Cl.

| | | |
|---|---|---|
| *H01M 4/90* | (2006.01) | |
| *H01M 4/92* | (2006.01) | |
| *H01M 12/08* | (2006.01) | |
| *H01M 4/86* | (2006.01) | |
| *H01M 12/02* | (2006.01) | |
| *H01M 12/04* | (2006.01) | |
| *C01B 32/05* | (2017.01) | |
| *H01M 12/06* | (2006.01) | |
| *H01M 8/1018* | (2016.01) | |

(52) U.S. Cl.
CPC ....... *H01M 4/9016* (2013.01); *H01M 4/9083* (2013.01); *H01M 4/926* (2013.01); *H01M 12/02* (2013.01); *H01M 12/04* (2013.01); *H01M 12/08* (2013.01); *H01M 12/06* (2013.01); *H01M 2008/1095* (2013.01); *Y02E 60/128* (2013.01)

(58) Field of Classification Search
CPC ...... H01M 4/926; H01M 12/02; H01M 12/04; H01M 12/08; H01M 12/06; H01M 2008/1095
USPC .................................................. 502/182, 152
See application file for complete search history.

(56) References Cited

U.S. PATENT DOCUMENTS

| | | | | |
|---|---|---|---|---|
| 7,482,303 | B2* | 1/2009 | Bosteels | B01D 53/9431 123/670 |
| 7,659,224 | B2* | 2/2010 | Shimazaki | B01J 23/42 420/460 |
| 9,620,775 | B2* | 4/2017 | Bresser | H01M 4/366 |
| 9,902,619 | B2* | 2/2018 | Choi | B82Y 30/00 |
| 2002/0132159 | A1* | 9/2002 | Ohya | H01M 4/8605 429/480 |
| 2002/0195591 | A1* | 12/2002 | Ravet | H01B 1/24 252/500 |
| 2005/0287421 | A1 | 12/2005 | Simon et al. | |
| 2006/0014908 | A1 | 1/2006 | Rotermund et al. | |
| 2006/0211802 | A1* | 9/2006 | Asgari | A61L 27/04 524/439 |
| 2008/0118649 | A1* | 5/2008 | Rathenow | A61L 27/303 427/385.5 |
| 2009/0170693 | A1* | 7/2009 | Ikeda | B01J 23/63 502/158 |
| 2011/0136036 | A1 | 6/2011 | Miyata et al. | |
| 2012/0077670 | A1* | 3/2012 | Morishita | B01J 21/18 502/182 |
| 2012/0231338 | A1 | 9/2012 | Matsuzaka et al. | |
| 2012/0235075 | A1* | 9/2012 | Iftime | H01F 1/0054 252/62.54 |
| 2012/0313053 | A1 | 12/2012 | Fujii et al. | |
| 2012/0328880 | A1* | 12/2012 | Asano | A61K 9/5089 428/402 |
| 2013/0058858 | A1 | 3/2013 | Uyama et al. | |
| 2013/0217567 | A1 | 8/2013 | Kishimoto et al. | |
| 2013/0273460 | A1* | 10/2013 | Moon | H01M 4/8657 429/532 |
| 2014/0023939 | A1* | 1/2014 | Chen | H01M 4/9016 429/405 |
| 2014/0099571 | A1* | 4/2014 | Proietti | H01M 4/8828 429/527 |
| 2014/0107371 | A1* | 4/2014 | Bakker | C07C 209/36 558/414 |
| 2014/0225041 | A1* | 8/2014 | Archer | H01M 4/364 252/503 |

FOREIGN PATENT DOCUMENTS

| | | | | |
|---|---|---|---|---|
| CN | 102666376 | A | 9/2012 | |
| CN | 102770371 | A | 11/2012 | |
| JP | 2003-054922 | * | 2/2003 | ............ C01B 31/02 |
| JP | 2006-012840 | A | 1/2006 | |
| JP | 3750024 | B2 | 3/2006 | |
| JP | 2006-512265 | A | 4/2006 | |
| JP | 2009-291706 | A | 12/2009 | |
| JP | 2011-006282 | A | 1/2011 | |
| JP | 2011-032117 | A | 2/2011 | |
| JP | 2011-190170 | A | 9/2011 | |
| JP | 2012-074234 | | * 4/2012 | ............ H01M 4/90 |
| WO | 2011/138937 | A1 | 11/2011 | |
| WO | 2012/063681 | A1 | 5/2012 | |

OTHER PUBLICATIONS

Bo Liu et al.,"Metal-Organic Framework as a Template for Porous Carbon Synthesis," Journal of the American Chemical Society, vol. 130, No. 16, Apr. 1, 2008, pp. 5390-5391, XP055306668, US.
Oct. 7, 2016 Extended Search Report issued in European Patent Application No. 14810964.8.
Oct. 25, 2016 Office Action issued in Japanese Patent Application No. 2013-126098.
Aug. 12, 2014 International Search Report issued in International Patent Application No. PCT/JP2014/064831.
May 17, 2017 Office Action issued in Chinese Patent Application No. 201480033720.6.

* cited by examiner

|            | $EO_2$ | i-0.7  |
|------------|--------|--------|
| EXAMPLE 1-1 | 0.80  | -0.313 |
| EXAMPLE 1-2 | 0.79  | -0.364 |
| EXAMPLE 1-3 | 0.58  | -0.003 |
| EXAMPLE 1-4 | 0.65  | -0.004 |

FIG.10

| | $EO_2$ |
|---|---|
| EXAMPLE 2-1 | 0.80 |
| EXAMPLE 2-2 | 0.78 |
| EXAMPLE 2-3 | 0.79 |

FIG.11

| | $EO_2$ |
|---|---|
| EXAMPLE 3-1 | 0.80 |
| COMPARATIVE EXAMPLE 3-1 | 0.74 |

POROUS CARBON CATALYST, METHOD FOR PRODUCING SAME, ELECTRODE AND BATTERY

TECHNICAL FIELD

The present invention relates to a porous carbon catalyst and a method of producing the same, and an electrode and a battery.

BACKGROUND ART

Hitherto, for example, in Patent Literature 1, there is a disclosure that a calcined porous body is obtained by calcining a porous body containing polyacrylonitrile.

CITATION LIST

Patent Literature

[Patent Literature 1] WO 2011/138937 A1

SUMMARY OF INVENTION

Technical Problem

However, in Patent Literature 1, there is no disclosure of a porous carbon catalyst exhibiting excellent catalytic activity.

The present invention has been made in view of the above-mentioned problem, and one of the objects of the present invention is to provide a porous carbon catalyst exhibiting excellent catalytic activity and a method of producing the same, and an electrode and a battery.

Solution to Problem

A method of producing a porous carbon catalyst according to one embodiment of the present invention for achieving the object includes carbonizing an organic polymer porous body having a skeleton containing a metal in an inside thereof. According to the one embodiment of the present invention, the method of producing a porous carbon catalyst exhibiting excellent catalytic activity is provided.

In the method, the organic polymer porous body may be formed through precipitation in a solution containing an organic polymer and the metal.

A porous carbon catalyst according to one embodiment of the present invention for achieving the object is obtained through carbonization of an organic polymer porous body having a skeleton containing a metal in an inside thereof. According to the one embodiment of the present invention, the porous carbon catalyst exhibiting excellent catalytic activity is provided.

For the porous carbon catalyst, the organic polymer porous body may be formed through precipitation in a solution containing an organic polymer and the metal.

A porous carbon catalyst according to one embodiment of the present invention for achieving the object includes a skeleton containing a metal in an inside thereof. According to the one embodiment of the present invention, the porous carbon catalyst exhibiting excellent catalytic activity is provided.

In addition, the porous carbon catalyst may be obtained through carbonization of an organic polymer porous body having a skeleton containing the metal in an inside thereof.

In addition, in the porous carbon catalyst, the skeleton may be a particle aggregate-like skeleton.

An electrode according to one embodiment of the present invention for achieving the object includes any one of the above-mentioned porous carbon catalysts. According to one the embodiment of the present invention, the electrode including the porous carbon catalyst exhibiting excellent catalytic activity is provided.

A battery according to one embodiment of the present invention for achieving the object includes the electrode. According to the one embodiment of the present invention, the battery including the porous carbon catalyst exhibiting excellent catalytic activity is provided.

Advantageous Effects of Invention

According to the embodiments of the present invention, the porous carbon catalyst exhibiting excellent catalytic activity and the method of producing the same, and the electrode and the battery, are provided.

BRIEF DESCRIPTION OF DRAWINGS

FIG. 10 is an explanatory view for showing an example of evaluation results of catalytic activities of the porous carbon catalysts in Example 2 according to the one embodiment of the present invention.

FIG. 11 is an explanatory view for showing an example of evaluation results of catalytic activities of porous carbon catalysts in Example 3 according to one embodiment of the present invention.

DESCRIPTION OF EMBODIMENTS

Figure 1A:
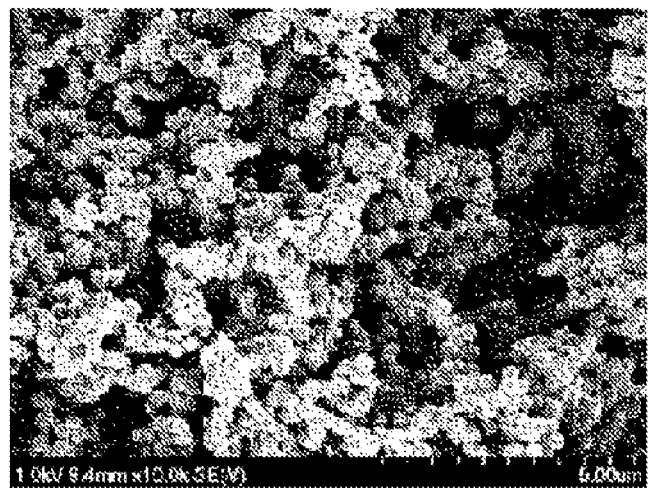
FIG. 1A is an explanatory view for showing an example of observation results of a porous carbon catalyst with a scanning electron microscope in Example 1 according to one embodiment of the present invention.

Embodiments of the present invention are described below. It should be noted that the present invention is not limited to examples described in these embodiments.

First, general description will be given of a porous carbon catalyst according to one embodiment of the present invention (hereinafter referred to as "catalyst of the present invention"). The catalyst of the present invention is a porous carbon catalyst. That is, the catalyst of the present invention is a carbon catalyst having a porous structure. More specifically, the catalyst of the present invention has a skeleton which is formed three-dimensionally so that a number of pores are formed in the inside thereof. The skeleton includes a carbon structure formed through carbonization of an organic polymer porous body, that will be described later. In addition, the porous structure of the catalyst of the present invention is not a porous structure having closed pores formed therein, like a molded foam body having closed pores, but a porous structure having communicating pores formed therein.

The catalyst of the present invention is, for example, a porous carbon catalyst having a porosity of 0.45 or more. The porosity of the catalyst of the present invention may be, for example, 0.50 or more, 0.55 or more, 0.60 or more, or 0.65 or more. An upper limit value of the porosity of the catalyst of the present invention is not particularly limited as long as the upper limit value is less than 1.0, but may be, for example, 0.95 or less.

The porosity of the catalyst of the present invention may fall within a range defined by any one of the above-mentioned lower limit values and any one of the above-mentioned upper limit values. It should be noted that the porosity of the catalyst of the present invention is calculated from the following equation based on the measurement results of the true density ($g/cm^3$) and bulk density ($g/cm^3$) of the catalyst of the present invention.

Porosity=1−(bulk density/true density)

In addition, the catalyst of the present invention exhibits catalytic activity. That is, the catalyst of the present invention is, for example, a carbonized material exhibiting catalytic activity by itself without supporting a metal catalyst (for example, a precious metal catalyst, such as platinum) on the surface thereof.

For example, the catalyst of the present invention exhibits oxygen reduction activity as the catalytic activity. For example, the oxygen reduction activity of the catalyst of the present invention is evaluated based on an oxygen reduction starting potential. For example, the oxygen reduction starting potential is determined as a voltage ($EO_2$) at which a reduction current of −10 $\mu A/cm^2$ flows based on data for showing a relationship between a voltage and a current density (oxygen reduction voltammogram) obtained by sweep applying a potential through the use of a rotating ring disk electrode apparatus including a working electrode onto which the catalyst of the present invention is applied.

Next, a method of producing a porous carbon catalyst according to one embodiment of the present invention (hereinafter referred to as "method of the present invention") and the catalyst of the present invention will be described in detail. The method of the present invention includes carbonizing an organic polymer porous body having a skeleton containing a metal in the inside thereof. In this case, the catalyst of the present invention is a porous carbon catalyst obtained through carbonization of the organic polymer porous body having a skeleton containing a metal in the inside thereof.

The organic polymer porous body is an organic polymer body having a porous structure. More specifically, the organic polymer porous body is a porous body which is formed of an organic polymer, and the porous body having a skeleton which is formed three-dimensionally so that a number of pores are formed in the inside thereof. The skeleton contains the organic polymer used as a raw material for the organic polymer porous body.

The organic polymer constituting the organic polymer porous body is not particularly limited as long as the organic polymer is capable of being carbonized. The organic polymer may include, for example, a homopolymer or a copolymer.

Specifically, the organic polymer may include, for example, one or more kinds selected from the group consisting of an acrylic polymer, a vinyl-based polymer, an olefin-based polymer, an ester-based polymer, a urethane-based polymer, polycarbonate, and a natural polymer.

The acrylic polymer may be, for example, one or more kinds selected from the group consisting of an acrylic acid-based polymer, a methacrylic acid-based polymer, an acrylonitrile-based polymer, and an acrylamide-based polymer.

The acrylic acid-based polymer may be, for example, a copolymer of acrylic acid and acrylonitrile. In addition, the acrylic acid-based polymer may be, for example, an acrylic acid ester-based polymer. The acrylic acid ester-based polymer may be, for example, a copolymer of an acrylic acid ester and acrylonitrile.

The methacrylic acid-based polymer may be, for example, a copolymer of methacrylic acid and acrylonitrile. In addition, the methacrylic acid-based polymer may be, for example, a methacrylic acid ester-based polymer. The methacrylic acid ester-based polymer may be, for example, a copolymer of a methacrylic acid ester and acrylonitrile.

The acrylonitrile-based polymer may be, for example, one or more kinds selected from the group consisting of polyacrylonitrile, a copolymer of acrylonitrile and acrylic acid, a copolymer of acrylonitrile and an acrylic acid ester, a copolymer of acrylonitrile and methacrylic acid, and a copolymer of acrylonitrile and a methacrylic acid ester.

The acrylamide-based polymer may be, for example, one or more kinds selected from the group consisting of polyacrylamide, a copolymer of acrylamide and acrylic acid, a copolymer of acrylamide and an acrylic acid ester, a copolymer of acrylamide and methacrylic acid, and a copolymer of acrylamide and a methacrylic acid ester.

The vinyl-based polymer may be, for example, one or more kinds selected from the group consisting of polyvinyl alcohol and polyvinylidene fluoride. The olefin-based polymer may be, for example, one or more kinds selected from the group consisting of polyolefins each having 3 to 10 carbon atoms (such as polyethylene and polypropylene), copolymers of two or more kinds of olefins each having 3 to 10 carbon atoms, and copolymers of an olefin having 3 to 10 carbon atoms and a monomer other than the olefin (such as an acrylic monomer or a vinyl-based monomer). In addition, the olefin-based polymer may be crystalline.

The ester-based polymer may be, for example, a polyester-based polymer. The polyester-based polymer may be, for example, polylactic acid. The urethane-based polymer may be, for example, polyurethane. The natural polymer may be, for example, one or more kinds selected from the group consisting of cellulose-based polymers (such as cellulose) and proteins (such as silk).

The organic polymer may include, for example, a nitrogen-containing organic polymer. The nitrogen-containing organic polymer is not particularly limited as long as the nitrogen-containing organic polymer contains one or more nitrogen atoms in its molecule and is capable of being carbonized.

The organic polymer may include, for example: one or more kinds selected from the group consisting of an acrylic polymer, a vinyl-based polymer, an olefin-based polymer, an ester-based polymer, a urethane-based polymer, polycarbonate, and a natural polymer; and a nitrogen-containing organic polymer. In this case, the one or more kinds selected from the above-mentioned group included in the organic polymer may include the nitrogen-containing organic polymer, or the organic polymer may include the nitrogen-containing organic polymer other than the one or more kinds selected from the above-mentioned group.

The organic polymer may include, for example, an oxygen-containing organic polymer. The oxygen-containing organic polymer is not particularly limited as long as the oxygen-containing organic polymer contains one or more oxygen atoms in its molecule and is capable of being carbonized.

The organic polymer may include, for example: one or more kinds selected from the group consisting of an acrylic polymer, a vinyl-based polymer, an olefin-based polymer, an ester-based polymer, a urethane-based polymer, polycarbonate, and a natural polymer; and an oxygen-containing organic polymer. In this case, the one or more kinds selected from the above-mentioned group included in the organic polymer may include the oxygen-containing organic polymer, or the organic polymer may include the oxygen-containing organic polymer other than the one or more kinds selected from the above-mentioned group.

The organic polymer may include, for example, a nitrogen-containing organic polymer and an oxygen-containing organic polymer. That is, the organic polymer may include, for example: one or more kinds selected from the group consisting of an acrylic polymer, a vinyl-based polymer, an olefin-based polymer, an ester-based polymer, a urethane-based polymer, polycarbonate, and a natural polymer; a nitrogen-containing organic polymer; and an oxygen-containing organic polymer. In this case, the organic polymer may include an organic polymer which is both a nitrogen-containing organic polymer and an oxygen-containing organic polymer.

The metal contained in the inside of the skeleton of the organic polymer porous body is not particularly limited as long as the catalyst of the present invention obtained through the use of the metal exhibits catalytic activity. Specifically, the metal may be, for example, one or more kinds selected from the group consisting of Group 3 elements, Group 4 elements, Group 5 elements, Group 6 elements, Group 7 elements, Group 8 elements, Group 9 elements, Group 10 elements, Group 11 elements, Group 12 elements, Group 13 elements, Group 14 elements, Group 15 elements, and Group 16 elements in the periodic table. The metal is preferably a transition metal (belonging to Group 3 to Group 12 in the periodic table), more preferably a transition metal belonging to the fourth period from Group 3 to Group 12 in the periodic table.

Specifically, the metal may be, for example, one or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (such as cerium (Ce)), and actinoids.

As the metal, a simple substance of the metal may be used, or a compound of the metal may be used. As the metal compound, for example, there may be used a metal salt, a metal oxide, a metal hydroxide, a metal nitride, a metal sulfide, a metal carbide, or a metal complex. Of those, a metal salt, a metal oxide, a metal sulfide, or a metal complex is preferably used.

The organic polymer porous body may further contain a component other than the organic polymer and the metal in the inside of its skeleton. Specifically, the skeleton of the organic polymer porous body may further contain, for example, a conductive carbon material.

The conductive carbon material is not particularly limited as long as the conductive carbon material imparts conductivity to the porous carbon catalyst produced by the method of the present invention or improves the conductivity of the porous carbon catalyst. The conductive carbon material may be, for example, a carbon material having conductivity and not exhibiting catalytic activity by itself.

Specifically, the conductive carbon material may be, for example, one or more kinds selected from the group consisting of carbon black, a carbon nanotube, a carbon nanohorn, a carbon fiber, a carbon fibril, and graphite powder.

A method of forming the organic polymer porous body is not particularly limited, but for example, the organic polymer porous body may be formed through precipitation in a solution containing the organic polymer and the metal.

That is, the catalyst of the present invention may be, for example, a porous carbon catalyst obtained through carbonization of the organic polymer porous body having a skeleton containing a metal in the inside thereof formed through precipitation in the solution containing the organic polymer and the metal.

It should be noted that the method of the present invention may or may not include forming the organic polymer porous body through precipitation in the solution containing the organic polymer and the metal. In a case where the method of the present invention does not include the forming the organic polymer porous body, the organic polymer porous body formed in advance is provided and then carbonized in the method of the present invention.

The method of forming the organic polymer porous body through precipitation in the solution containing the organic polymer and the metal is not particularly limited, but for example, may include: dissolving the organic polymer and the metal in a solvent under a first condition, to prepare the solution containing the organic polymer and the metal; and then allowing the organic polymer porous body to precipitate in the solution under a second condition different from the first condition.

More specifically, for example, a combination of the organic polymer and the solvent is firstly selected so that the organic polymer is dissolved in the solvent under the first condition and is precipitated in the solvent to form the organic polymer porous body under the second condition.

Next, the selected organic polymer and the metal are dissolved in the selected solvent under the first condition, to prepare the solution containing the organic polymer and the metal. After that, the condition is changed from the first condition to the second condition, to cause phase separation in the solution and thus allow the organic polymer porous body to precipitate. It should be noted that the preparation of the solution containing the organic polymer and the metal is accomplished by fixing the organic polymer, the metal (metal simple substance and/or metal compound), and the solvent by an operation such as stirring. The organic polymer and the metal are substantially uniformly dispersed in the solution through the mixing.

For example, the first condition and the second condition may be set to have a first temperature and a second temperature lower than the first temperature, respectively. Specifically, for example, the method of the present invention may include: dissolving the organic polymer and the metal in the solvent heated to the first temperature, to prepare the solution containing the organic polymer and the metal; and then cooling the solution to the second temperature lower than the first temperature, to allow the organic polymer porous body to precipitate in the solution.

The solvent may be, for example, one prepared by mixing a poor solvent for the organic polymer and a good solvent for the organic polymer. The poor solvent for the organic polymer may be, for example, a solvent in which 50 g or more of the organic polymer can not be dissolved with respect to 1 L of the solvent, a solvent in which 30 g or more of the organic polymer can not be dissolved with respect to 1 L of the solvent, or a solvent in which 10 g or more of the organic polymer can not be dissolved with respect to 1 L of the solvent. The good solvent for the organic polymer may be, for example, a solvent in which 10 g or more of the organic polymer can be dissolved with respect to 1 L of the solvent, a solvent in which 30 g or more of the organic polymer can be dissolved with respect to 1 L of the solvent, or a solvent in which 50 g or more of the organic polymer can be dissolved with respect to 1 L of the solvent. That is, the solvent may be, for example, one prepared by mixing the poor solvent in which 50 g or more of the organic polymer can not be dissolved with respect to 1 L of the solvent and the good solvent in which 50 g or more of the organic polymer can be dissolved with respect to 1 L of the solvent, one prepared by mixing the poor solvent in which 30 g or more of the organic polymer can not be dissolved with respect to 1 L of the solvent and the good solvent in which 30 g or more of the organic polymer can be dissolved with respect to 1 L of the solvent, or one prepared by mixing the poor solvent in which 10 g or more of the organic polymer can not be dissolved with respect to 1 L of the solvent and the good solvent in which 10 g or more of the organic polymer can be dissolved with respect to 1 L of the solvent. The mixing ratio between the poor solvent and the good solvent is appropriately adjusted so that the organic polymer is dissolved under the first condition and precipitates under the second condition, as described above.

In addition, after the organic polymer porous body is formed by precipitation in the solution containing the organic polymer and the metal, the solvent in the solution may be replaced by the poor solvent for the organic polymer. That is, in this case, for example, the method of the present invention may include: dissolving the organic polymer and the metal in a first solvent (for example, a solvent prepared by mixing the poor solvent for the organic polymer and the good solvent for the organic polymer) under the first condition, to prepare the solution containing the organic polymer and the metal; allowing the organic polymer porous body to precipitate in the solution under the second condition; and then replacing the first solvent by a second solvent, which is the poor solvent for the organic polymer, to obtain the organic polymer porous body.

In a case where the first solvent is a solvent prepared by mixing a first poor solvent for the organic polymer and the good solvent for the organic polymer, the second solvent may be a poor solvent for the organic polymer other than the first poor solvent. A method of replacing the solvent is not particularly limited, but one example is, a method involving: taking out the organic polymer porous body from the solution prepared by dissolving the organic polymer and the metal in the first solvent; and washing the organic polymer porous body with the second solvent.

In addition, in a case where the solvent of the solution containing the organic polymer and the metal is replaced by the poor solvent for the organic polymer, insolubilization treatment of the metal may be performed before the replacement of the solvent. That is, in this case, for example, the method of the present invention that includes: dissolving the organic polymer and the metal in a first solvent under the first condition, to prepare the solution containing the organic polymer and the metal; allowing the organic polymer porous body to precipitate in the solution under the second condition; and then replacing the first solvent by a second solvent, which is the poor solvent for the organic polymer, to obtain the organic polymer porous body, may further include performing insolubilization treatment of the metal in the second solvent after allowing the organic polymer porous body to precipitate and before replacing the solvent.

By performing the insolubilization treatment of the metal in the second solvent in advance, leakage of the metal from the organic polymer porous body into the second solvent is effectively suppressed during the replacement of the solvent with the second solvent and after the replacement.

The insolubilization treatment of the metal is not particularly limited, but may be, for example, alkali treatment. The alkali treatment may be, for example, a treatment to bring the metal into contact with an alkali. Specifically, the insolubilization treatment of the metal may be performed by, for example, immersing the organic polymer porous body taken out from the solution in a solution containing an alkali, or adding an alkali to the solution containing the organic polymer porous body. The alkali may be, for example, one or more kinds selected from the group consisting of ammonia water, a sodium hydroxide aqueous solution, and a potassium hydroxide aqueous solution.

In addition, the method of the present invention may include: carbonizing an organic polymer porous body having a particle aggregate-like skeleton containing a metal in the inside thereof; and obtaining a porous carbon catalyst having a particle aggregate-like skeleton. That is, in this case, the organic polymer porous body has a particle aggregate-like skeleton and contains a metal in the inside of the skeleton.

In this case, the catalyst of the present invention has a particle aggregate-like skeleton. In addition, the catalyst of the present invention may be, for example, a porous carbon catalyst which is obtained through carbonization of the organic polymer porous body having a skeleton containing a metal in the inside thereof, and the porous carbon catalyst having a particle aggregate-like skeleton. Further, the catalyst of the present invention may be, for example, a porous carbon catalyst which is obtained through carbonization of the organic polymer porous body having a particle aggregate-like skeleton containing a metal in the inside thereof, and the porous carbon catalyst having a particle aggregate-like skeleton.

The particle aggregate-like skeleton is, for example, a skeleton of a porous structure which has an external appearance that is formed of aggregating particles when observed with an electron microscope (see electron micrographs shown in the drawings of this application). This particle aggregate-like skeleton is, for example, preferably formed through precipitation in the solution containing the organic polymer and the metal.

It should be noted that organic polymer porous bodies each having the particle aggregate-like skeleton are also disclosed in JP 2009-30017 A, JP 2011-236292 A, and JP 2012-251057 A, which are Japanese patent application laid-open publications, and WO 2012/063591 A1, which is an international patent publication pamphlet.

In addition, the method of the present invention may include carbonizing the organic polymer porous body having a particle aggregate-like skeleton containing a metal in the inside thereof formed through precipitation in the solution containing the organic polymer and the metal.

In this case, the catalyst of the present invention may be, for example, a porous carbon catalyst which is obtained through carbonization of the organic polymer porous body having a particle aggregate-like skeleton containing a metal in the inside thereof formed through precipitation in the solution containing the organic polymer and the metal, and the organic polymer porous body having a particle aggregate-like skeleton containing the metal in the inside thereof.

In addition, in the method of the present invention, the organic polymer porous body may be dried, and the dried organic polymer porous body may be carbonized. The drying temperature of the organic polymer porous body is not particularly limited, but may be set to, for example, a temperature falling within a range of from −50° C. to 200° C. A method of drying the organic polymer porous body is not particularly limited, but there may be given, for example, a method involving drying the organic polymer porous body under reduced pressure (for example, vacuum drying).

A method of carbonizing the organic polymer porous body is not particularly limited as long as the organic polymer contained in the organic polymer porous body is carbonized. Specifically, in the carbonization, the organic polymer porous body is heated and retained at a temperature (carbonization temperature) at which the organic polymer porous body is carbonized.

The carbonization temperature is not particularly limited as long as the organic polymer porous body is carbonized at the temperature, and may be set to, for example, 300° C. or more. More specifically, the carbonization temperature may be set to, for example, 300° C. or more and 1,500° C. or less, 400° C. or more and 1,500° C. or less, or 500° C. or more and 1,500° C. or less.

A temperature increase rate during the heating of the organic polymer porous body to the carbonization temperature is not particularly limited, and may be set to, for example, 0.5° C./min or more and 300° C./min or less. A retention time period for which the organic polymer porous body is retained at the carbonization temperature (carbonization time period) is not particularly limited as long as the time period is sufficient for the carbonization of the organic polymer porous body, and may be set to, for example, 5 minutes or more. More specifically, the carbonization time period may be set to, for example, 5 minutes or more and 240 minutes or less, or 20 minutes or more and 180 minutes or less. The carbonization is preferably performed under an inert gas (for example, under a flow of the inert gas), such as a nitrogen gas.

In addition, in the method of the present invention, infusibilization treatment may be performed before the carbonization. That is, the method of the present invention may include: subjecting the organic polymer porous body having a skeleton containing a metal in the inside thereof to infusibilization treatment; and then carbonizing the organic polymer porous body. In a case where the infusibilization treatment of the organic polymer porous body is performed before the carbonization, the porous carbon catalyst effectively retaining the porous structure is reliably obtained.

The infusibilization treatment is not particularly limited as long as the infusibilization treatment is a treatment to infusibilize the organic polymer contained in the organic polymer porous body. The infusibilization treatment may be performed by, for example, heating the organic polymer porous body at a temperature lower than the carbonization temperature.

Specifically, the method of the present invention may include: subjecting the organic polymer porous body to infusibilization treatment at a first temperature; and then carbonizing the organic polymer porous body at a second temperature higher than the first temperature.

The temperature at which the organic polymer porous body is infusibilized (infusibilization temperature) is not particularly limited as long as the organic polymer contained in the organic polymer porous body is infusibilized at the temperature, and may be set to, for example, 100° C. or more and 500° C. or less. More specifically, for example, it may be appropriate to set the infusibilization temperature to 150° C. or more and 500° C. or less and set the carbonization temperature to 500° C. or more and 1,500° C. or less, so that the carbonization temperature is higher than the infusibilization temperature.

The infusibilization treatment may be performed in air, but is preferably performed in an inert gas (for example, under a flow of the inert gas), such as a nitrogen gas. In a case where the infusibilization treatment is performed in an inert gas, the organic polymer porous body preferably contains the oxygen-containing organic polymer.

In addition, the infusibilization treatment may be continuously performed in a plurality of stages having different infusibilization temperatures. Specifically, in this case, for example, the method of the present invention may include: subjecting the organic polymer porous body to first infusibilization treatment through heating at a first temperature; subjecting the organic polymer porous body to second infusibilization treatment through further heating at a second temperature higher than the first temperature; and then carbonizing the organic polymer porous body through further heating at a third temperature higher than the second temperature.

Specifically, for example, it may be appropriate to set the first infusibilization temperature at which the first infusibilization treatment is performed to 100° C. or more and 300° C. or less, and set the second infusibilization temperature at which the second infusibilization treatment is performed to 300° C. or more and 500° C. or less, so that the second infusibilization temperature is higher than the first infusibilization temperature, and to set the carbonization temperature at which the carbonization is performed to 500° C. or more and 1,500° C. or less so that the carbonization temperature is higher than the second infusibilization temperature. In addition, the first infusibilization treatment may be performed in air and the second infusibilization and the carbonization may be performed in an inert gas.

In the method of the present invention, a carbonized material obtained through the carbonization as described above may itself be obtained as the porous carbon catalyst. That is, by carbonization of the organic polymer porous body having a skeleton containing a metal in the inside thereof, a porous carbonized material having a skeleton containing the metal in the inside thereof and exhibiting catalytic activity is obtained. Thus, the porous carbonized material exhibiting catalytic activity may be obtained as the catalyst of the present invention.

In addition, the porous carbonized material obtained as described above is further subjected to treatment, and the porous carbonized material subjected to the treatment may be obtained as the catalyst of the present invention. Specifically, for example, the porous carbonized material is pulverized, and the pulverized porous carbonized material may be obtained as the catalyst of the present invention. It should be noted that, for example, as a result of pulverization of the porous carbon catalyst having a particle aggregate-like skeleton, the skeleton is pulverized, and the catalyst of the present invention may be a mixture of a carbon catalyst formed of particles which were constituting the skeleton (particulate carbon catalyst) and a pulverized porous carbon catalyst having the particle aggregate-like skeleton.

In addition, for example, the porous carbonized material is subjected to metal removal treatment, and the porous carbonized material after the metal removal treatment may be obtained as the catalyst of the present invention. The metal removal treatment is treatment for removing part or all of the metal contained in the porous carbonized material. The metal removal treatment may be, for example, washing treatment with an acid, or electrolytic treatment.

The acid to be used in the washing treatment with an acid is not particularly limited as long as the effect of the metal removal treatment is obtained, and for example, one or more kinds selected from the group consisting of hydrochloric acid (such as concentrated hydrochloric acid), nitric acid (such as concentrated nitric acid), and sulfuric acid (such as concentrated sulfuric acid) may be used.

The catalyst of the present invention obtained by subjecting the porous carbonized material having a skeleton containing a metal in the inside thereof to the metal removal treatment may, for example, still contain the metal in the inside of its skeleton. Specifically, in this case, at least part of the metal contained in the surface of the skeleton of the porous carbonized material is removed through the metal removal treatment. However, at least part of the metal contained in the inside of the skeleton of the porous carbonized material is not removed through the metal removal treatment and remains in the inside of the skeleton even after the metal removal treatment.

Accordingly, for example, the catalyst of the present invention may have a skeleton containing a metal (a metal derived from the organic polymer porous body before carbonization) in the inside thereof and not substantially containing tire metal in the surface thereof.

In addition, for example, in the catalyst of the present invention, the metal density in the inside of the skeleton (the amount of the metal contained per unit area or per unit volume of the skeleton) may be higher than the metal density at the surface of the skeleton.

It should be noted that the catalyst of the present invention may contain a metal in the inside ox its skeleton irrespective of whether or not its production method includes subjecting the porous carbonized material to the metal removal treatment. In this case, the catalyst of the present invention is a porous carbon catalyst having a skeleton containing a metal in the inside thereof. That is, the catalyst of the present invention has a porous structure and contains a metal in the inside of the skeleton of the porous structure. Accordingly, for example, in observation of a cross section of the skeleton of the catalyst of the present invention (for example, in observation with a transmission electron microscope), the presence of a metal (for example, metal fine particles) is confirmed in a portion corresponding to the inside of the skeleton. In a case where the catalyst of the present invention contains a metal in the inside of its skeleton, the catalyst of the present invention may further contain the metal (the metal derived from the organic polymer porous body) at the surface of its skeleton.

Thus, in this case, the method of the present invention includes: carbonizing the organic polymer porous body having a skeleton containing a metal in the inside thereof; and obtaining a porous carbon catalyst having a skeleton containing the metal in the inside thereof.

That is, in this case, the catalyst of the present invention is a porous carbon catalyst which is obtained through carbonization of the organic polymer porous body having a skeleton containing a metal in the inside thereof, and the porous carbon catalyst having a skeleton containing the metal in the inside thereof. In addition, the catalyst of the present invention, may be, for example, a porous carbon catalyst which is obtained through carbonization of the organic polymer porous body having a skeleton containing a metal in the inside thereof formed through precipitation in the solution containing the organic polymer and the metal, and the porous carbon catalyst having a skeleton containing the metal in the inside thereof.

In addition, for example, the method of the present invention may include: carbonizing the organic polymer porous body having a particle aggregate-like skeleton containing a metal in the inside thereof; and obtaining a porous carbon catalyst having a particle aggregate-like skeleton containing the metal in the inside thereof.

In this case, the catalyst of the present invention is a porous carbon catalyst having a particle aggregate-like skeleton containing a metal in the inside thereof. That is, the catalyst of the present invention has a particle aggregate-like skeleton and contains a metal in the inside of the skeleton. In addition, the catalyst of the present invention may be, for example, a porous carbon catalyst which is obtained through carbonization of the organic polymer porous body having a particle aggregate-like skeleton containing a metal in the inside thereof, and the porous carbon catalyst having a particle aggregate-like skeleton containing the metal in the inside thereof.

In addition, for example, the catalyst of the present invention obtained by subjecting the porous carbonized material having a skeleton containing a metal in the inside thereof to the metal removal treatment may not contain the metal in its skeleton. That is, in this case, the metal contained in the surface of the skeleton of the porous carbonized material and the metal contained in the inside of the skeleton are removed by the metal removal treatment, and the metal no longer remains in the skeleton after the metal removal treatment.

In addition, in the method of the present invention, for example, the porous carbonized material is subjected to the metal removal treatment, the porous carbonized material is then subjected to heat treatment, and the porous carbonized material after the heat treatment may be obtained as the catalyst of the present invention.

In this case, the heat treatment is performed by retaining the porous carbonized material at a predetermined temperature (heat treatment temperature). The heat treatment temperature may be set to 300° C. or more. More specifically, the heat treatment temperature may be set to, for example, 300° C. or more and 1,500° C. or less, 400° C. or more and 1,500° C. or less, or 500° C. or more and 1,500° C. or less.

The heat treatment temperature may be set to the same temperature as or a different temperature from the carbonization temperature described above. That is, the heat treatment temperature may be set to a temperature lower than the carbonization temperature or a temperature higher than the carbonization temperature.

The catalyst of the present invention obtained as described above exhibits excellent catalytic activity. That is, for example, the catalyst of the present invention obtained through carbonization of the organic polymer porous body having a skeleton containing a metal in the inside thereof exhibits higher catalytic activity (for example, oxygen reduction activity) compared to a porous carbon catalyst obtained through carbonization of an organic polymer porous body having a skeleton not containing the metal in the inside thereof and containing the metal only at the surface thereof.

In addition, for example, the catalyst of the present invention having a skeleton containing a metal in the inside thereof exhibits higher catalytic activity (for example, oxygen reduction activity) compared to a porous carbon catalyst having a skeleton not containing the metal in the inside thereof and containing the metal only at the surface thereof (that is, the porous carbon catalyst obtained through carbonization of an organic polymer porous body having a skeleton not containing the metal in the inside thereof and containing the metal only at the surface thereof).

The mechanism by which the catalyst of the present invention exhibits such excellent catalytic activity is not clearly understood, but for example, is considered to be as follows: when the organic polymer porous body having a skeleton containing a metal in the inside thereof is carbonized, a carbon structure including an active site is effectively formed under the presence of the metal while the porous structure is maintained.

Herein, as described above, the catalyst of the present invention may contain a metal in the inside of its skeleton, but the catalytic activity of the catalyst of the present invention results from the carbon structure itself constituting the skeleton. In this regard, for example, in Example 2 described later, it is confirmed that no significant difference exists between the catalytic activity of the catalyst of the present invention subjected to the metal removal treatment and the catalytic activity of the catalyst of the present invention without the metal removal treatment.

As described above, the mechanism by which the carbon structure constituting the skeleton of the catalyst of the present invention exhibits high catalytic activity is not clearly understood, but for example, is considered to be as follows: when the organic polymer porous body having a skeleton containing a metal in the inside thereof is carbonized, a specific carbon structure including an active site is effectively formed around the metal at least in the inside of the skeleton. In addition, it is considered that, even in a case the metal is removed from the skeleton, the carbon structure formed through carbonization exhibits high catalytic activity.

The catalyst of the present invention exhibiting such excellent catalytic activity may be, for example, an electrode catalyst for a battery, a catalyst for hydrogen peroxide decomposition, an environmental catalyst, or a synthesis catalyst. When the catalyst of the present invention is the electrode catalyst for a battery, the catalyst of the present invention may be, for example, an electrode catalyst for a fuel cell or an electrode catalyst for an air cell.

An electrode according to one embodiment of the present invention (hereinafter referred to as "electrode of the present invention") is an electrode including the catalyst of the present invention. That is, the electrode of the present invention is, for example, an electrode in which the catalyst of the present invention is supported. Specifically, the electrode of the present invention is, for example, an electrode including an electrode base material and the catalyst of the present invention supported on the electrode base material.

The electrode of the present invention is, for example, an electrode for a battery. Specifically, the electrode of the present invention is, for example, an electrode for a fuel cell or an electrode for an air cell. In addition, the electrode of the present invention may be, for example, a cathode electrode or an anode electrode, and is preferably a cathode electrode.

A battery according to one embodiment of the present invention (hereinafter referred to as "battery of the present invention") is a battery including the electrode of the present invention. That is, the battery of the present invention is a battery including the electrode of the present invention as one or both of a cathode electrode and an anode electrode. Specifically, the battery of the present invention is, for example, a fuel cell or an air cell. In addition, the battery of the present invention may include, for example, a membrane/electrode assembly including the electrode of the present invention.

Next, specific Examples according to the embodiments of the present invention will be described.

EXAMPLE 1

Example 1-1

In 38 g of a solvent (DMSO/water=85/15) prepared by mixing dimethyl sulfoxide (DMSO) (good solvent) and distilled water (poor solvent) at a volume ratio of 85:15, a copolymer (AN-MA copolymer) of acrylonitrile and methacrylic acid in an amount giving a concentration of 5 wt % and 10.6 mmol of iron chloride hexahydrate ($FeCl_3.6H_2O$) were dissolved at 90° C. Thus, a solution containing the AN-MA copolymer and iron was prepared.

After that, the solution containing the AN-MA copolymer and iron was left to stand at a room temperature of 20° C., and an organic polymer porous body which was a gel-like precipitate was formed in the solution. Next, the resultant organic polymer porous body was immersed in ammonia water for 30 minutes.

After that, the organic polymer porous body was washed with methanol (poor solvent), and thus the DMSO/distilled water (85/15) solvent and the ammonia water were replaced by methanol. The resultant organic polymer porous body was vacuum dried at a room temperature of 20° C., to obtain an organic polymer porous body having a skeleton containing iron in the inside thereof.

Then, the dried organic polymer porous body was heated first at 205° C. in air for 3 hours, then at 450° C. in a nitrogen gas for 30 minutes, and subsequently at 1,000° C. in a nitrogen gas for 1 hour. Thus, the organic polymer porous body was carbonized (calcined).

Thus, a porous carbon catalyst which was a porous carbonized material having a skeleton containing iron in the inside thereof was obtained. Further, the resultant porous carbon catalyst was pulverized. Specifically, silicon nitride balls each having a diameter of 10 mm were placed in a planetary ball mill, and the porous carbon catalyst was subjected to pulverization treatment with the planetary ball mill at a rotational speed of 650 rpm for 5 minutes in 10 cycles. After that, the pulverized porous carbon catalyst was taken out, and allowed to pass through a sieve having an opening of 106 μm. The porous carbon catalyst having passed through the sieve was obtained.

Example 1-2

A porous carbon catalyst having a skeleton, which contains cobalt in the inside thereof, was obtained in the same manner as in Example 1-1 described above except that cobalt chloride hexahydrate ($CoCl_2.6H_2O$) was used instead of iron chloride hexahydrate.

Example 1-3

A porous carbon catalyst having a skeleton containing nickel in the inside thereof was obtained in the same manner as in Example 1-1 described above except that nickel chloride hexahydrate ($NiCl_2.6H_2O$) was used instead of iron chloride hexahydrate.

Example 1-4

A porous carbon catalyst having a skeleton, which contains zinc in the inside thereof, was obtained in the same manner as in Example 1-1 described above except that zinc chloride ($ZnCl_2$) was used instead of iron chloride hexahydrate.

[Observation with Electron Microscope]

The porous carbon catalysts obtained in Example 1-1, Example 1-2, Example 1-3, and Example 1-4 described above were each observed with a scanning electron microscope (SEM). In addition, the porous carbon catalyst obtained in Example 1-2 was also observed with a transmission electron microscope (TEM).

[Evaluation of Oxygen Reduction Activity]

The porous carbon catalysts obtained in Example 1-1, Example 1-2, Example 1-3, and Example 1-4 described above were each evaluated for oxygen reduction activity. That is, first, a catalyst slurry was prepared. Specifically, each porous carbon catalyst in a powder form was weighed in an amount of 5 mg, and 50 μL of a binder solution (Nafion (trademark), manufactured by Du Pont Kabushiki Kaisha), 150 μL of distilled water, 150 μL of ethanol, and two spatulas of glass beads (about 15 beads) (each having a diameter of 1 mm) were mixed therein. The mixture was subjected to ultrasonic treatment for 10 minutes, to prepare a catalyst slurry in which the porous carbon catalyst was dispersed uniformly.

Next, 2.2 μL of the catalyst slurry was aspirated with a pipette, and applied onto a disk electrode (0.1256 $cm^2$) of a rotating ring disk electrode apparatus (RRDE-3A Ver. 1.2, manufactured by BAS Inc.), followed by being dried, to produce a working electrode. A platinum electrode was used as a ring electrode. A silver/silver chloride (Ag/AgCl) electrode was used as a counter electrode. A solution obtained by dissolving oxygen in a 0.5 M sulfuric acid aqueous solution at room temperature was used as an electrolyte solution.

Then, an electrochemical analyzer (CHI700D, manufactured by ALS Co., Ltd) was used to perform linear sweep voltammetry. In the linear sweep voltammetry, a potential was calculated by converting a value measured through the use of the silver/silver chloride electrode into a value with reference to a normal hydrogen electrode (NHE).

First, the electrolyte solution was saturated with oxygen through bubbling of oxygen at 25° C. for 20 minutes, and then measurement was started. Next, the potential was kept at an initial potential for 600 seconds, and the electrode was then allowed to rotate at a rotational speed of 1,500 rpm. The potential was swept at a sweep rate of 1 mV/sec from 0.8 V (vs. Ag/AgCl) to −0.2 V (vs. Ag/AgCl) at 25° C., and the value of a current flowing through the working electrode was measured. That is, the potential was swept from 1.0 V (vs. NHE) to 0 V (vs. NHE) when converted into a value with reference to the normal hydrogen electrode (NHE).

The current in the measurement was recorded as a function of the potential. In addition, based on a polarization curve thus obtained, a voltage at which a reduction current of −10 μA/$cm^2$ flowed was recorded as "oxygen reduction starting potential ($EO_2$)" (V vs. NHE). In addition, a current density (mA/$cm^2$) at which a voltage of 0.7 V (vs. NHE) was applied was recorded as "i−0.7".

[Results]

Figure 1B:
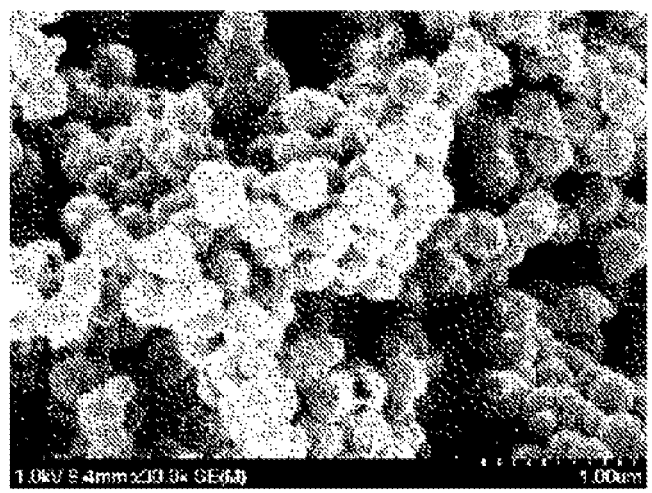
FIG. 1B is an explanatory view for showing part of FIG. 1A in an enlarged scale.
Figure 2A:
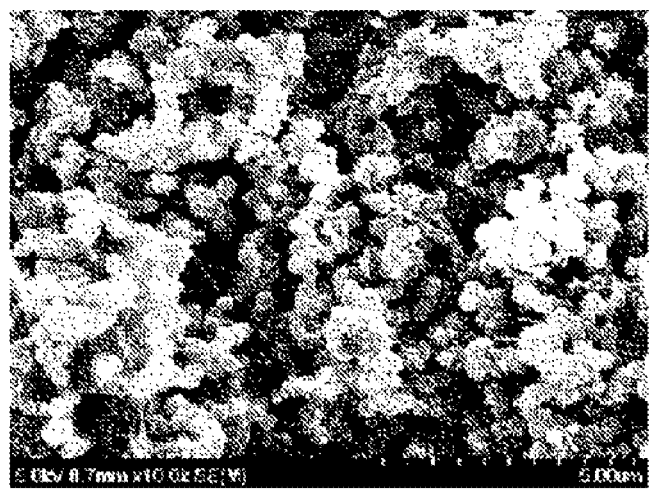
FIG. 2A is an explanatory view for showing another example of observation results of a porous carbon catalyst with a scanning electron microscope in Example 1 according to the one embodiment of the present invention.
Figure 2B:
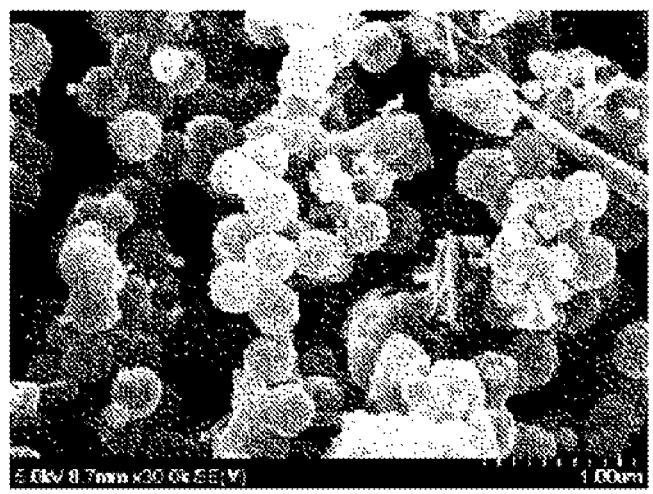
FIG. 2B is an explanatory view for showing part of FIG. 2A in an enlarged scale.
Figure 3A:
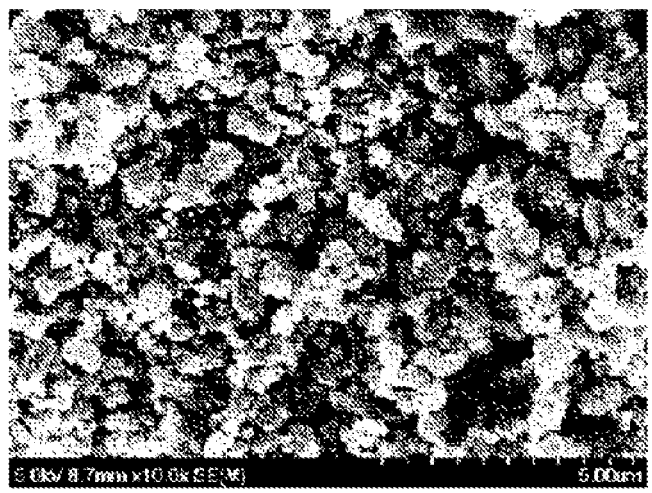
FIG. 3A is an explanatory view for showing still another example of observation results of a porous carbon catalyst with a scanning electron microscope in Example 1 according to the one embodiment of the present invention.
Figure 3B:
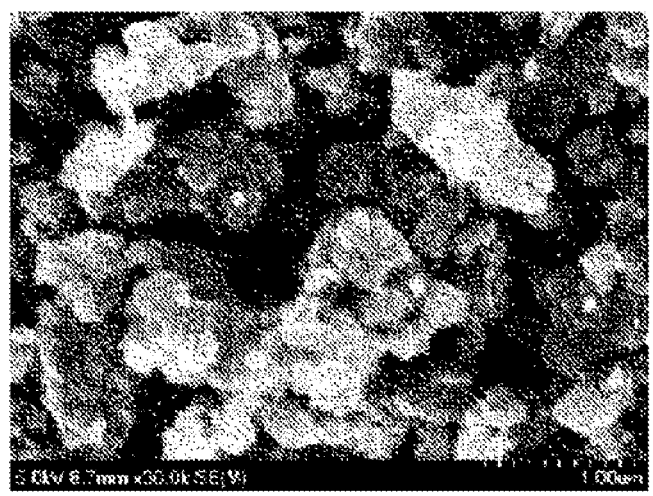
FIG. 3B is an explanatory view for showing part of FIG. 3A in an enlarged scale.
Figure 4A:
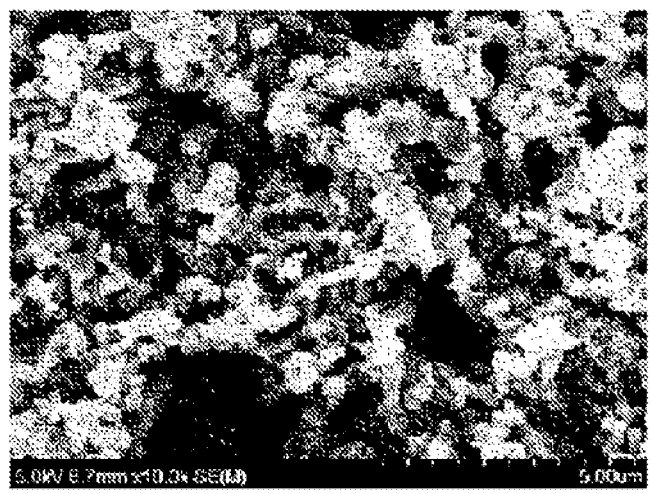
FIG. 4A is an explanatory view for showing still another example of observation results of a porous carbon catalyst with a scanning electron microscope in Example 1 according to the one embodiment of the present invention.
Figure 4B:
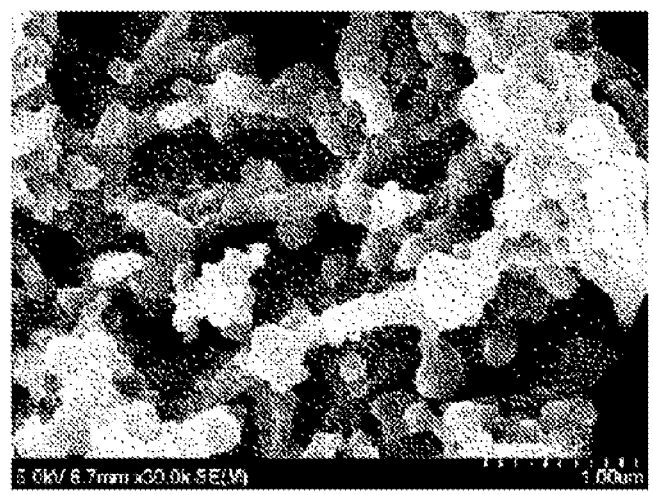
FIG. 4B is an explanatory view for showing part of FIG. 4A in an enlarged scale.

FIG. 1A and FIG. 1B are SEM images of the porous carbon catalyst having a skeleton containing iron in the inside thereof obtained in Example 1-1. Part of FIG. 1A is shown in FIG. 1B in an enlarged scale. FIG. 2A and FIG. 2B are SEM images of the porous carbon catalyst having a skeleton containing cobalt in the inside thereof obtained in Example 1-2. Part of FIG. 2A is shown in FIG. 2B in an enlarged scale. FIG. 3A and FIG. 3B are SEM images of the porous carbon catalyst having a skeleton containing nickel in the inside thereof obtained in Example 1-3. Part of FIG. 3A is shown in FIG. 3B in an enlarged scale. FIG. 4A and FIG. 4B are SEM images of the porous carbon catalyst having a skeleton containing zinc in the inside thereof obtained in Example 1-4. Part of FIG. 4A is shown in FIG. 4B in an enlarged scale.

As shown in those SEM images, the porous carbon catalysts each had a porous structure. Each porous structure had formed therein a number of communicating pores. In addition, the porous carbon catalysts each had a particle aggregate-like skeleton. It should also be noted that the organic polymer porous bodies before the carbonization were each confirmed to have a porous structure similar to that of the corresponding porous carbon catalyst (the porous structure having a particle aggregate-like skeleton) through SEM observation, although the resultant images are not shown.

Figures 5, 6:
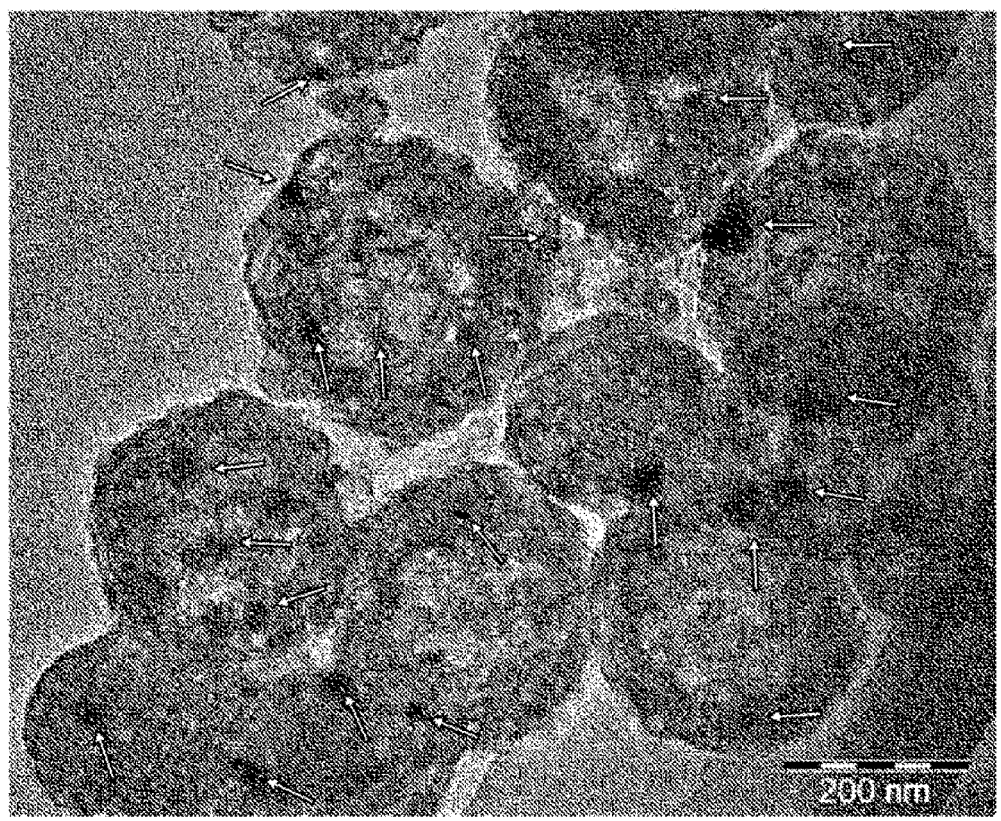
FIG. 5 is an explanatory view for showing an example of observation results of a porous carbon catalyst with a transmission electron microscope in Example 1 according to the one embodiment of the present invention.
FIG. 6 is an explanatory view for showing an example of evaluation results of catalytic activities of the porous carbon catalysts in Example 1 according to the one embodiment of the present invention.

FIG. 5 is a TEM image of the porous carbon catalyst obtained in Example 1-2. The arrows shown in FIG. 5 represent metal fine particles contained in the skeleton of the porous carbon catalyst. As shown in FIG. 5, the metal fine particles were observed as dispersed black particles in a portion corresponding to the inside of the particle aggregate-like skeleton of the porous carbon catalyst (more specifically, a portion corresponding to the inside of a particulate portion constituting the skeleton). That is, in FIG. 5, it was confirmed that a metal was contained in the inside of the skeleton of the porous carbon catalyst. In addition, it was also confirmed that the metal was dispersedly arranged in the inside of the skeleton of the porous carbon catalyst.

The evaluation results of the oxygen reduction activities of the porous carbon catalysts are shown in FIG. 6. That is, in FIG. 6, for each of the porous carbon catalysts obtained in Example 1-1, Example 1-2, Example 1-3, and Example 1-4, the measurement results of the oxygen reduction starting potential (V vs. NHE) ("$EO_2$" in FIG. 6), which is a voltage at which a reduction current of −10 μA/cm² flows, and the current density (mA/cm²) ("i–0.7" in FIG. 6) at which a voltage of 0.7 V (vs. NHE) is applied are shown.

As shown in FIG. 6, it was confirmed that the porous carbon catalysts halving a skeleton containing iron, cobalt, nickel, or zinc in the inside thereof each exhibited excellent oxygen reduction activity. Of those, the porous carbon catalysts having a skeleton containing iron or cobalt in the inside thereof (Example 1-1 and Example 1-2) were each confirmed to exhibit particularly excellent oxygen reduction activity.

That is, it was confirmed that the porous carbon catalyst having a skeleton containing one or more kinds selected from the group consisting of iron, cobalt, nickel, and zinc in the inside thereof exhibited excellent catalytic activity. In particular, it was confirmed that the porous carbon catalyst having a skeleton containing one or more kinds selected from the group consisting of iron and cobalt in the inside thereof exhibited particularly excellent catalytic activity.

EXAMPLE 2

Example 2-1

In 38 g of a DMSO/distilled water (85/15) solvent, an AN-MA copolymer in an amount giving a concentration of 5 wt %, 2.1 mmol of iron chloride hexahydrate (FeCl$_3$.6H$_2$O), and 8.5 mmol of zinc chloride (ZnCl$_2$) were dissolved at 90° C. Thus, a solution containing the AN-MA copolymer, iron, and zinc was prepared.

After that, the solution containing the AN-MA copolymer, iron, and zinc was left to stand at a room temperature of 20° C., and an organic polymer porous body which was a gel-like precipitate having a skeleton containing iron and zinc in the inside thereof was formed in the solution. Next, the resultant organic polymer porous body was immersed in ammonia water for 30 minutes.

After that, the organic polymer porous body was washed with methanol, and thus the DMSO/distilled water (85/15) solvent and the ammonia water were replaced by methanol. The resultant organic polymer porous body having a skeleton containing iron and zinc in the inside thereof was vacuum dried at a room temperature of 20° C.

Then, the dried organic polymer porous body was heated first at 205° C. in air for 3 hours, then at 450° C. in a nitrogen gas for 30 minutes, and subsequently at 1,000° C. in a nitrogen gas for 1 hour. Thus, the organic polymer porous body was carbonized (calcined). Thus, a porous carbon catalyst which was a porous carbonized material having a skeleton containing iron and zinc in the inside thereof was obtained. Further, the resultant porous carbon catalyst was pulverized in the same manner as in Example 1-1 described above.

Example 2-2

A porous carbon catalyst having a skeleton containing iron and nickel in the inside thereof was obtained in the same manner as in Example 2-1 described above except that nickel chloride hexahydrate (NiCl$_2$.6H$_2$O) was used instead of zinc chloride and the porous body was heated at 1,100° C. instead of at 1,000° C. in the final heating of its stepwise calcination.

Example 2-3

A porous carbon catalyst having a skeleton containing cobalt and zinc in the inside thereof was obtained in the same manner as in Example 2-1 described above except that cobalt chloride hexahydrate (CoCl$_2$.6H$_2$O) was used instead of iron chloride hexahydrate.

[Observation with Electron Microscope]

The porous carbon catalysts obtained in Example 2-1, Example 2-2, and Example 2-3 described above were each observed with a scanning electron microscope (SEM).

[Evaluation of Oxygen Reduction Activity]

The porous carbon catalysts obtained in Example 2-1, Example 2-2, and Example 2-3 described above were each evaluated for oxygen reduction activity in the same manner as in Example 1 described above.

[Results]

Figure 7A:
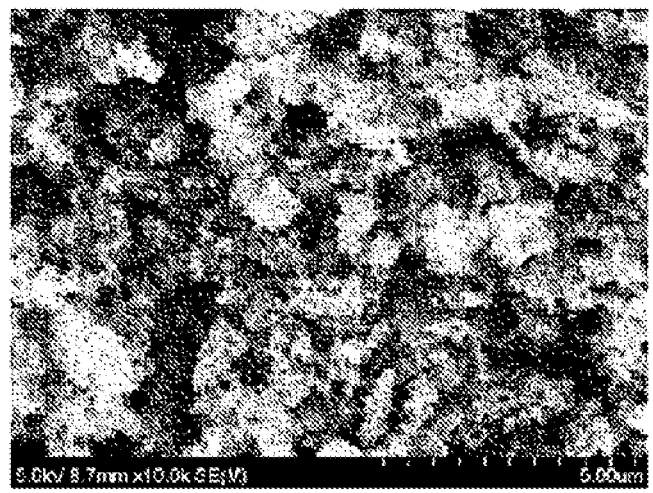
FIG. 7A is an explanatory view for showing an example of observation results of a porous carbon catalyst with a scanning electron microscope in Example 2 according to one embodiment of the present invention.
Figure 7B:
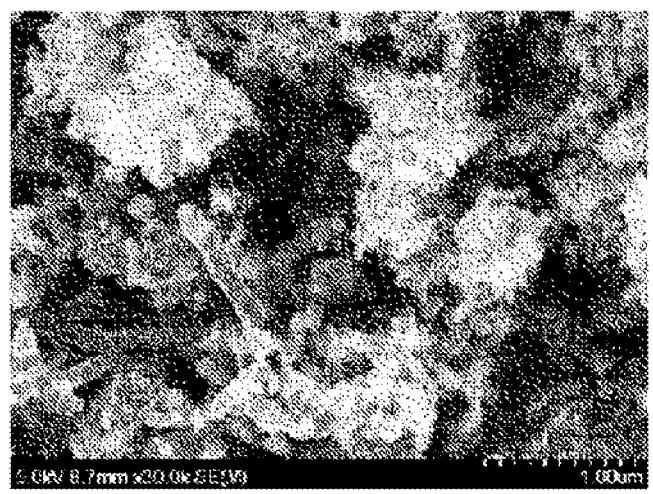
FIG. 7B is an explanatory view for showing part of FIG. 7A in an enlarged scale.
Figure 8A:
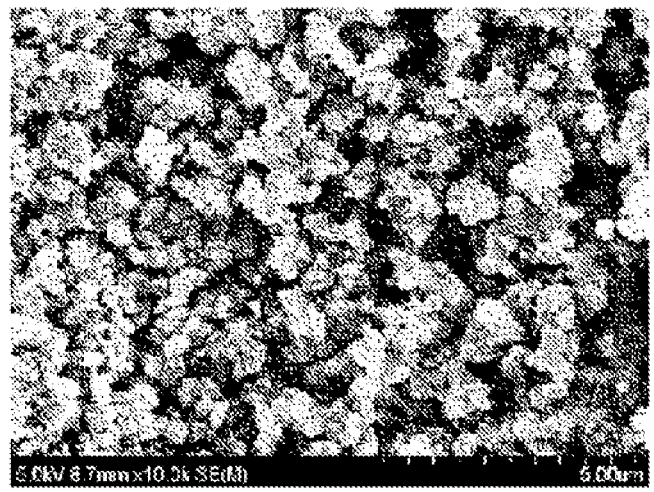
FIG. 8A is an explanatory view for showing another example of observation results of a porous carbon catalyst with a scanning electron microscope in Example 2 according to one embodiment of the present invention.
Figure 8B:
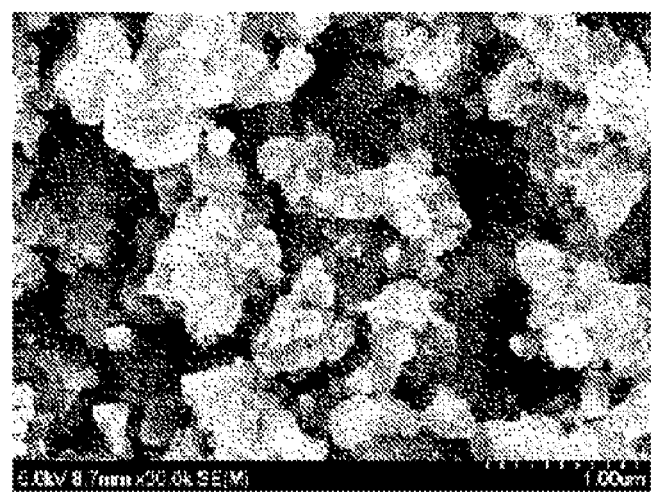
FIG. 8B is an explanatory view for showing part of FIG. 8A in an enlarged scale.
Figure 9A:
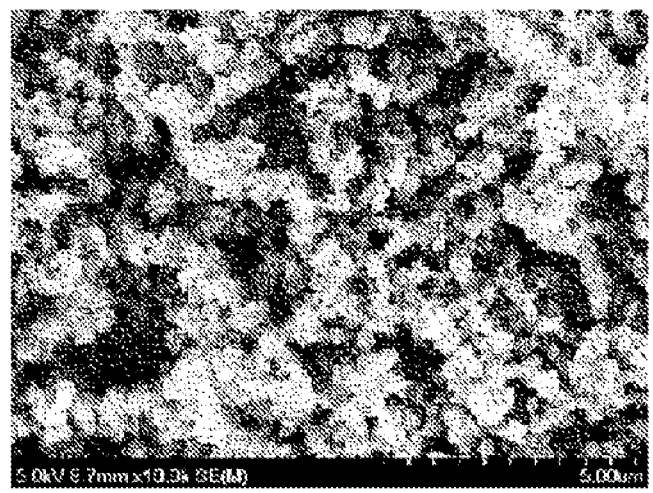
FIG. 9A is an explanatory view for showing still another example of observation results of a porous carbon catalyst with a scanning electron microscope in Example 2 according to the one embodiment of the present invention.
Figure 9B:
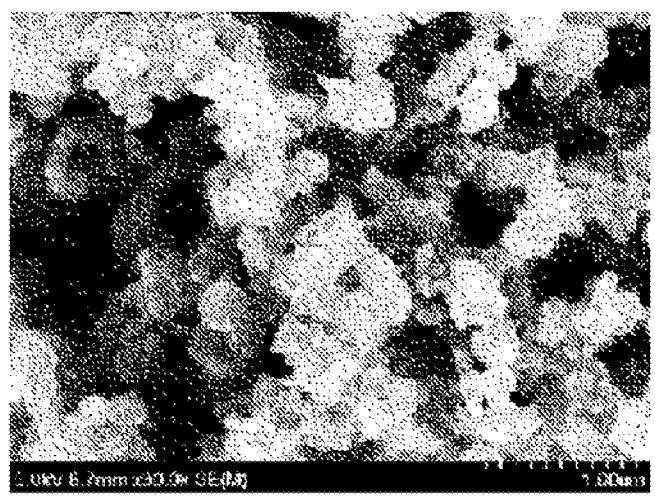
FIG. 9B is an explanatory view for showing part of FIG. 9A in an enlarged scale.

FIG. 7A and FIG. 7B are SEM images of the porous carbon catalyst having a skeleton containing iron and zinc in the inside thereof obtained in Example 2-1. Part of FIG. 7A is shown in FIG. 7B in an enlarged scale. FIG. 8A and FIG. 8B are SEM images of the porous carbon catalyst having a skeleton containing iron and nickel in the inside thereof obtained in Example 2-2. Part of FIG. 8A is shown in FIG. 8B in an enlarged scale. FIG. 9A and FIG. 9B are SEM images of the porous carbon catalyst having a skeleton containing cobalt and zinc in the inside thereof obtained in Example 2-3. Part of FIG. 9A is shown in FIG. 9B in an enlarged scale.

As shown in those SEM images, the porous carbon catalysts each had a porous structure. Each porous structure had formed therein a number of communicating pores. In addition, the porous structure of each of the porous carbon catalysts had a particle aggregate-like skeleton.

The evaluation results of the oxygen reduction activities of the porous carbon catalysts are shown in FIG. 10. That is, in FIG. 10, for each of the porous carbon catalysts obtained in Example 2-1, Example 2-2, and Example 2-3, the measurement result of the oxygen reduction starting potential (V vs. NHE) ("EO$_2$" in FIG. 10), which is a voltage at which a reduction current of −10 μA/cm² flows is applied, is shown.

As shown in FIG. 10, it was confirmed that the porous carbon catalysts each exhibited excellent oxygen reduction activity. That is, it was confirmed that the porous carbon catalyst having a skeleton containing one or more kinds selected from the group consisting of iron and cobalt in the inside thereof exhibited excellent catalytic activity. More specifically, it was confirmed that the porous carbon catalyst having a skeleton containing one or more kinds selected from the group consisting of iron and cobalt exhibited excellent catalytic activity even in a case where the porous carbon catalyst further contained one or more kinds selected from the group consisting of nickel and zinc in the inside of its skeleton. In addition, with reference to the results of Example 1 described above, it was confirmed that the porous carbon catalyst having a skeleton containing one or more kinds selected from the group consisting of iron and cobalt exhibited excellent catalytic activity even in a case where, for example, the porous carbon catalyst did not contain nickel and/or zinc in the inside of its skeleton.

In addition, a porous carbon catalyst obtained by subjecting the porous carbon catalyst obtained in Example 2-1 described above to metal removal treatment and then heat treatment was also evaluated for oxygen reduction activity in the same manner, although the evaluation result is not shown in FIG. 10. As a result, it was confirmed that no significant difference existed in the oxygen reduction starting potential of the porous carbon catalyst irrespective of the presence or absence of the metal removal treatment and the heat treatment.

It should be noted that as the metal removal treatment, washing treatment with an acid was performed as described below. Specifically, 100 mL of concentrated hydrochloric acid was added to 1 g of the porous carbon catalyst, followed by stirring for 1 hour. Next, the porous carbon catalyst was allowed to deposit, and the concentrated hydrochloric acid was removed. After that, 100 mL of an acid solution prepared by mixing concentrated hydrochloric acid and distilled water at a ratio of 1:1 (volume ratio) was added, followed by stirring for 1 hour. Further, the porous carbon catalyst was allowed to deposit and the acid solution was removed, and then 100 mL of distilled water was added, followed by stirring for 1 hour. After that, the resultant acid solution containing the porous carbon catalyst was filtered by using a filtration membrane (pore diameter: 1.0 μm, manufactured by Millipore), and washing with distilled water was performed until a neutral filtrate was obtained. The collected porous carbon catalyst was vacuum dried at 60° C. for 12 hours. Further, the porous carbon catalyst subjected to metal removal treatment in this manner was placed in a quarts tube, and subjected to heat treatment through heating at 700° C. under a nitrogen atmosphere for 1 hour.

In addition, the porous carbon catalyst obtained in Example 2-1 described above and a non-porous carbon catalyst obtained by carbonizing a non-porous organic polymer composition without forming the organic polymer porous body were each evaluated for porosity, although the evaluation results are not shown in the drawings. As a result, it was found that the porous carbon catalyst had a porosity of 0.7, whereas the non-porous carbon catalyst had a porosity of 0.4.

That is, it was confirmed that the porosity of the porous carbon catalyst was higher than that of the non-porous carbon catalyst. This resulted from the fact that the bulk density of the porous carbon catalyst was lower than that of the non-porous carbon catalyst.

It should be noted that the non-porous carbon catalyst was produced as described below. That is, in the same manner as in Example 2-1 described above, in 38 g of a DMSO/distilled water (85/15) solvent, an AM-MA copolymer in an amount giving a concentration of 5 wt %, 2.1 mmol of iron chloride hexahydrate ($FeCl_3 \cdot 6H_2O$), and 8.5 mmol of zinc chloride ($ZnCl_2$) were dissolved at 90° C. Thus, a solution containing the AN-MA copolymer, iron, and zinc was prepared.

It should be noted that, after that, the solvent of the solution containing the AN-MA copolymer, iron, and zinc was removed by drying without cooling the solution, that is, without forming the organic polymer porous body by precipitation. Thus, an organic polymer composition containing the AH-MMA copolymer, iron, and zinc was obtained. It was found that the organic polymer composition did not have a porous structure as in the organic polymer porous body (more specifically, the porous structure having a particle aggregate-like skeleton).

In addition, the dried organic polymer composition was heated first at 205° C. in air for 3 hours, then at 450° C. in a nitrogen gas for 30 minutes, and subsequently at 1,000° C. in a nitrogen gas for 1 hour. Thus, the mixture was carbonized (calcined), to obtain the non-porous carbon catalyst, which was a non-porous carbonized material. It was found that the non-porous carbon catalyst also did not have a porous structure as in the porous carbon catalyst (more specifically, the porous structure having a particle aggregate-like skeleton).

In addition, the porosity was evaluated as described below. Specifically, a bulk density measurement device (manufactured by Micromeritics Instrument Corporation) was used to measure the true densities ($g/cm^3$) and bulk densities ($g/cm^3$) of each of the porous carbon catalyst and the non-porous carbon catalyst. Then, based on the measurement results, the porosities of the porous carbon catalyst and the non-porous carbon catalyst were each calculated from the following equation.

Porosity=1−(bulk density/true density)

EXAMPLE 3

Example 3-1

A porous carbon catalyst having a skeleton containing iron and zinc in the inside thereof was produced in the same manner as in Example 2-1 described above.

Comparative Example 3-1

On the other hand, a porous carbon catalyst serving as a comparative control was produced. Specifically, in 38 g of a DMSO/distilled water (85/15) solvent, an AN-MA copolymer in an amount giving a concentration of 5 wt % was dissolved at 90° C. Thus, a solution containing the AN-MA copolymer was prepared.

After that, the solution containing the AN-MA copolymer was left to stand at a room temperature of 20° C., and an organic polymer porous body which was a gel-like precipitate was formed in the solution. Then, the organic polymer porous body was washed with methanol, and thus the DMSO/distilled water (85/15) solvent and ammonia water were replaced by methanol. The resultant organic polymer porous body was vacuum dried at a room temperature of 20° C.

The dried organic polymer porous body was immersed in a solution prepared by dissolving iron chloride hexahydrate ($FeCl_3 \cdot 6H_2O$) and zinc chloride ($ZnCl_2$) in methanol, followed by vacuum drying at room temperature. Thus, an organic polymer porous body having a skeleton having supported on its surface iron and zinc was obtained.

Then, the dried organic polymer porous body was heated first at 205° C. in air for 3 hours, then at 450° C. in a nitrogen gas for 30 minutes, and subsequently at 1,000° C. in a nitrogen gas for 1 hour. Thus, the organic polymer porous body was carbonized (calcined), to obtain a porous carbon catalyst.

[Evaluation of Oxygen Reduction Activity]

The porous carbon catalysts obtained in Example 3-1 and Comparative Example 3-1 described above were each evaluated for oxygen reduction activity in the same manner as in Example 1 described above.

[Results]

The evaluation results of the oxygen reduction activities of the porous carbon catalysts are shown in FIG. 11. That is, in FIG. 11, for each of the porous carbon catalysts obtained in Example 3-1 and Comparative Example 3-1, the measurement result of the oxygen reduction starting potential (V vs. NHE) ("$EO_2$" in FIG. 11), which is a voltage at which a reduction current of −10 μA/$cm^2$ flows, is shown.

As shown in FIG. 11, it was confirmed that the oxygen reduction activity of the porous carbon catalyst obtained in Example 3-1 was excellent compared to that of the porous carbon catalyst obtained in Comparative Example 3-1. It should also be noted that the porous carbon catalyst obtained in Comparative Example 3-1 was confirmed to have a porous structure in a form similar to that of the porous carbon catalyst obtained in Example 3-1 (the porous structure having a particle aggregate-like skeleton) by SEM observation, although the resultant image is not shown.

The invention claimed is:

1. A method of producing a porous carbon catalyst, the method comprising dissolving an organic polymer and a metal in a solvent under a first condition to prepare a solution containing the organic polymer and the metal, forming an organic polymer porous body having a skeleton containing the metal in an inside thereof, wherein the skeleton is a particle aggregate-like skeleton, through precipitation in the solution under a second condition different from the first condition, and carbonizing the organic polymer porous body, wherein the formation of the organic polymer porous body through the precipitation is performed by changing the condition from the first condition to the second condition to cause phase separation in the solution containing the organic polymer and the metal.

2. The method of producing a porous carbon catalyst according to claim 1, wherein the first condition is a first temperature and the second condition is a second temperature lower than the first temperature.

3. The method of producing a porous carbon catalyst according to claim 2, wherein the organic polymer and the metal are dissolved in the solvent heated to the first temperature, and then the solution is cooled to the second temperature to precipitate the organic polymer porous body.

4. A method of producing a porous carbon catalyst, the method comprising dissolving an organic polymer and a metal in a solvent under a first condition to prepare a solution containing the organic polymer and the metal, forming an organic polymer porous body having a skeleton containing the metal in an inside thereof, wherein the skeleton is a particle aggregate-like skeleton, through precipitation in the solution under a second condition different from the first condition, and carbonizing the organic polymer porous body, wherein the method further comprises performing an insolubilization treatment of the metal after the precipitation of the organic polymer porous body, and replacing the solvent by a poor solvent for the organic polymer, the poor solvent being a solvent in which 50 g or more of the organic polymer cannot be dissolved with respect to 1 L of the solvent, wherein the organic polymer porous body is carbonized after replacing the solvent.

5. The method of producing a porous carbon catalyst according to claim 4, wherein the formation of the organic polymer porous body through the precipitation is performed by changing the condition from the first condition to the second condition to cause phase separation in the solution containing the organic polymer and the metal.

6. The method of producing a porous carbon catalyst according to claim 5, wherein the first condition is a first temperature and the second condition is a second temperature lower than the first temperature.

7. The method of producing a porous carbon catalyst according to claim 6, wherein the organic polymer and the metal are dissolved in the solvent heated to the first temperature, and then the solution is cooled to the second temperature to precipitate the organic polymer porous body.

* * * * *